June 24, 1930.  A. SMITH ET AL  1,768,457
BRAKE MECHANISM
Filed March 14, 1929
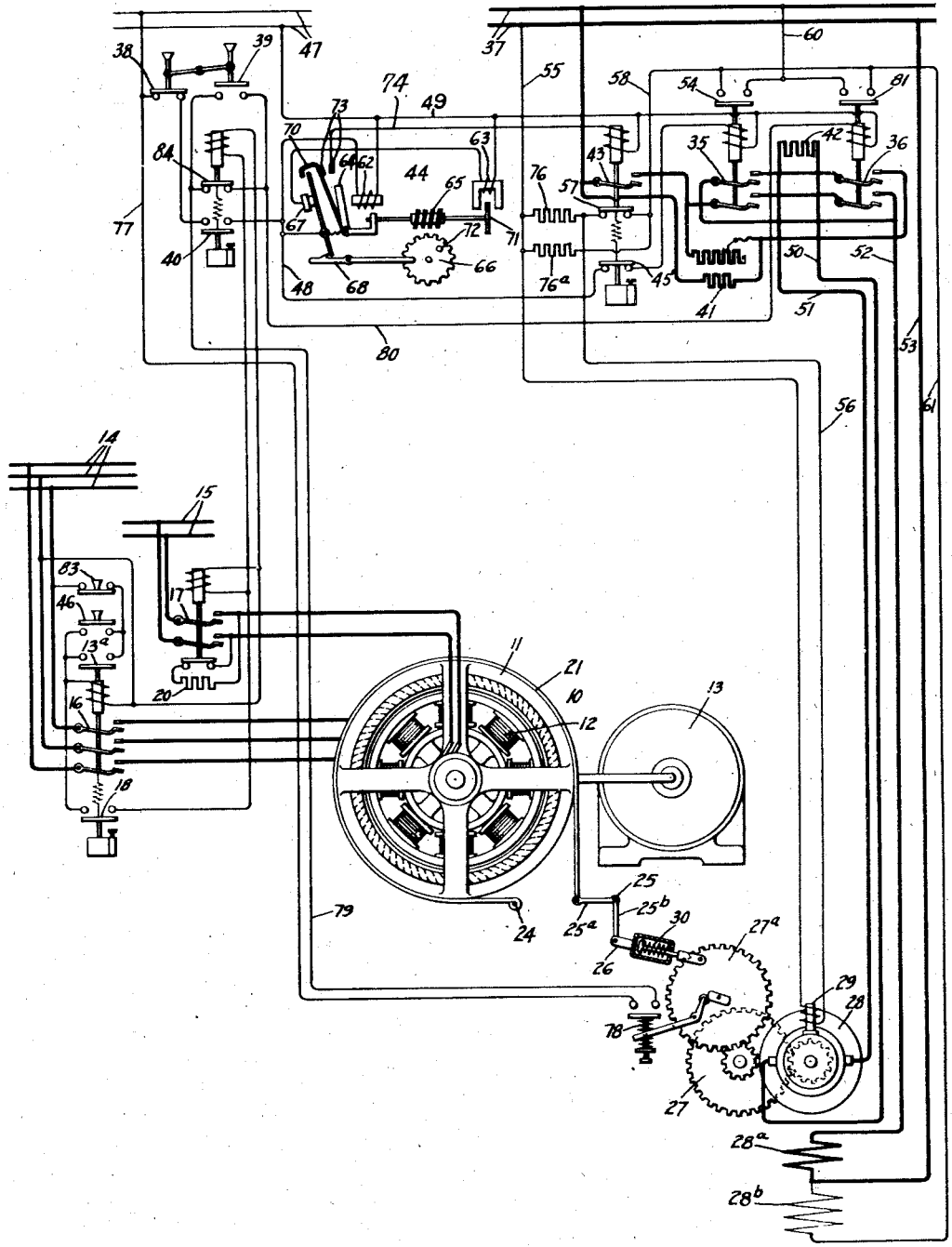
Inventor:
Aubrey Smith,
Richard M. Matson,
by Charles E. Tillar
His Attorney.

Patented June 24, 1930

1,768,457

UNITED STATES PATENT OFFICE

AUBREY SMITH, OF SCOTIA, AND RICHARD M. MATSON, OF SCHENECTADY, NEW YORK, ASSIGNORS TO GENERAL ELECTRIC COMPANY, A CORPORATION OF NEW YORK

BRAKE MECHANISM

Application filed March 14, 1929. Serial No. 347,057.

Our invention relates to brake mechanisms, more particularly to brake mechanisms such as employed in bringing heavy rotating bodies to rest, and has for its object the provision of a simple, reliable and efficient brake of this character.

Although it obviously has other applications, our invention is particularly useful in the braking of the stator members of synchronous motors.

Synchronous motors are able to develop but a very small starting torque and therefore it is impractical to start the motor with the load connected thereto where a large starting torque is required, as, for example, in driving a large cement mill. In one arrangement for starting such a motor under load, the motor is provided with a stator member which is capable of being rotated, and during the starting operation this stator is first brought up to synchronous speed with the rotor and its connected load stationary. After the stator has been brought up to synchronous speed, a brake is applied to the stator and it is brought to rest, the rotor being thereby brought up to synchronous speed.

It is desirable to bring the stator to rest fairly rapidly, but not so rapidly as to cause the brake to seize or to cause an excessive inrush of current to the motor or to cause the imposition of a heavy strain upon the brake mechanism. It is further desirable to increase the braking force upon the stator after it has been brought to rest in order to prevent any possibility of the stator slipping under sudden changes of load. In one of its aspects our invention has for its object a simple and reliable braking mechanism, one effecting a smooth, gradual and uniform application of the braking force to the synchronous motor stator and one effecting positive locking means for the stator after it has been brought to rest.

With brakes of this character, it has been found that a large proportion of the heat, which is generated by the braking operation and which is absorbed largely by the stator member, would dissipate itself through the braking means provided for the stator. As a result, oftentimes after the increased braking force had been applied to lock the stator, the stator would be released by reason of the thermal expansion of the braking member. In another of its aspects our invention has for its object the application of a substantially constant braking force irrespective of the expansion of the braking member.

In carrying out our invention in one form we provide a friction braking member for the motor stator, the braking member being urged into frictional engagement with the motor stator during the braking operation by a predetermined force effected by the operation of an electric torque motor acting through a lever mechanism. After the stator has been brought to rest by the action of the predetermined force, an additional force is transmitted through the lever mechanism to the braking member for locking the stator member securely. In order to insure that the latter force will remain substantially constant irrespective of the thermal expansion of the braking member, we interpose in the lever mechanism means for absorbing this thermal expansion while at the same time permitting substantially the full force exerted by the motor to be transmitted to the braking member. Moreover, we insure substantially synchronous operating conditions before the brake motor is energized to apply the brake.

For a more complete understanding of our invention reference should be had to the accompanying drawing in which the single figure illustrates in diagrammatic form a synchronous motor provided with a brake embodying our invention.

Referring to the drawing, we have shown our invention in one form as applied to a synchronous motor having both its armature and field mounted for rotation. As shown, the synchronous motor 10 is provided with a rotatable stator 11 constituting an armature and a rotatable field member 12 to which the load 13 is mechanically connected. It is believed unnecessary for a proper understanding of this invention to illustrate in detail the disposition of the armature and field windings since any preferred well-known arrangement may be employed. As shown, a suitable three-phase alternating current source of supply 14 is provided for energizing the armature of the motor, while a suitable direct current source of supply 15 is provided for exciting the motor field. The power connections for the synchronous motor are controlled by a suitable switch 16, shown as an electroresponsive switch, interposed in the connections leading to the motor from the supply source 14, while the excitation of the motor is controlled by a suitable switch 17, shown as an electroresponsive switch, interposed in the connections leading to the field windings from the excitation source 15 and which is in turn controlled by a time element switch 18 the operation of which is initiated by the closing of the main contactor. It will be understood that this timing switch 18 will be so adjusted that substantially synchronous operating conditions will prevail before the field will be applied to the motor.

It will be understood that in the starting operation, the synchronous motor 10 will be operated in any suitable manner, for example, as an induction motor, the armature being brought up to synchronous speed with the field 12 included in a local circuit with a suitable discharge resistance 20. After the armature has attained substantially synchronous speed, the field will be applied and the armature be braked in order that the field to which the load 13 is attached may be brought up to synchronous speed. Suitable brake mechanism is provided for bringing the rotatable stator 11 to rest after it has first been brought up to synchronous speed.

The brake mechanism comprises a suitable brake band 21, actuating means and a lever mechanism through which the actuating means controls the braking motion of the band. As shown, the band 21 practically surrounds the entire outer periphery of the stator 11, one end of the band being secured at 24 to a rigid support (not shown) and the other end being secured to the lever mechanism so that the band may be applied to or released from the stator 11 as desired by the actuating means.

As shown, the slack end of the brake band is secured to one arm 25$^a$ of a suitable fixedly pivoted bell crank 25, the other arm 25$^b$ of which is connected through a link 26 and a suitable reduction gear train 27 with an operating motor 28. It will be observed that this reduction gearing will permit a comparatively small operating motor to exert a considerable braking force upon the stator. Moreover, it will be observed that clockwise rotation, as viewed in the figure, of the motor 28 will effect a clockwise rotation of the gear 27$^a$ so that the bell crank will be forced in a counterclockwise direction to apply the brake band while rotation of the motor 28 in the opposite direction will effect a release of the brake.

Preferably, the motor 28 will be of the direct current compounded torque type. Thus, as will be readily understood, the motor, for a given armature current input, will transmit to the stator a substantially constant braking force which force, of course, may be controlled by suitably controlling the armature current.

This torque motor will be provided with a suitable friction brake 29 which will serve to lock the motor after it has operated to apply or release the brake band 21. Preferably, this brake 29 will be of the electromagnetic spring actuated type in which a spring serves to apply the brake and the electromagnet when energized serves to release the brake.

It will be understood that the friction band 21 preferably will be formed from a suitable metallically reinforced friction material. Thus, the band 21 may comprise an asbestos inner lining suitably riveted or otherwise mechancially connected to an outer metallic lining. As has been pointed out, considerable heat is generated during the braking operation and this heat to a large extent is absorbed by the comparatively massive stator member. After the stator member has been braked and brought to rest, large quantities of this stored heat will be transmitted to the metallic outer lining through the rivets or other means employed to secure the linings. As a result the metallic band expands. It will be observed, therefore, that after the motor 28 has been brought to rest and locked by its brake 29, the effect of the thermal expansion of the brake band is to release the stator. Obviously, this is undersirable. In order to absorb this linear expansion, we interpose in the link 26, which serves to connect the brake band with its actuating motor, a compression spring 30 of comparatively great strength. It will be observed that with the motor locked in its brake applying position, as the band expands under the influence of the heat emitted from the stator the spring will expand slightly and thereby maintain the braking force substantially constant.

As has been pointed out, it is desirable to bring the stator, after it has attained substantially synchronous speed, to rest fairly rapidly, but not so rapidly as to cause the brake to seize or to cause an excessive inrush of current to the motor or to cause the imposition of a heavy strain upon the braking mechanism. Moreover, as has been pointed out, it is desirable to positively lock or cinch up the stator after it has been brought to rest.

Suitable control means are provided for the braking motor 28 so that the motor will be caused to automatically apply the braking force to the stator 11 in accordance with the above mentioned desired braking characteristics. The motor is provided with a forward or braking contactor 35, a reverse or release contactor 36, a suitable direct current source of supply 37 of substantially constant potential and a pair of push buttons 38 and 39 for controlling certain operations of the motor. The energization of the braking contactor 35 is caused to respond to the attainment of synchronous speed by the stator by means of a time element switch 40 the operation of which is initiated responsively to the application of the synchronous motor field. It will be understood that the switch 40 interposes this time element between the energization of the synchronous motor field and that of the braking motor to insure stable synchronous operating conditions before the brake is applied. The braking force of the torque motor 28 will be controlled by the resistances 41 and 42. The resistance 41, as shown, is connected in series with the motor armature and thus in series with the motor series field 28ª, while the comparatively large resistance 42 is connected in parallel with the motor armature. This resistance 42 is connected permanently in parallel with the armature circuit thereby insuring a gradual and easy application of the brake band. It will be understood that the initial braking force will be effected by inserting the resistance 41 in the motor armature circuit while the final or cinch upbraking force will be effected by the removal of the resistance 41 or a portion thereof from the motor armature circuit.

The resistance 41 is controlled by a contactor 43 which is energized to short circuit the resistor or a portion thereof responsively to the operation of a suitable time element switching mechanism 44. Thus, the switching mechanism 44 will be suitably timed so that after the load has been brought up to synchronous speed under the influence of the initial braking force, the contactor 43 will be energized to short circuit the resistance 41, in consequence of which the motor 28 will operate to cinch up the brake. It will be understood that a suitable relay responsive to the current supplied to the armature or a suitable speed responsive indicator may be provided to energize the contactor 43 when the stator has thus been brought to rest. After the motor has thus been caused to cinch up the brake, a time element switch 45 will operate to open the energizing circuit for the braking contactor so as to deenergize the braking motor 28.

The operation of the brake as actuated by the automatically controlled motor is as follows: In order to start the synchronous motor 10, the operator will push the start button 46 provided to effect an energization of the main contactor 16. As a result, the main contactor will close and the stator will begin to rotate, the brake, of course, during this operation being released. It will be observed that the contactor 16 when closed will complete an energizing circuit for itself through its associated interlock 13ª. The closing of the main contactor 16 will initiate the operation of the time element switching mechanism 18 which, after the stator has attained substantially synchronous speed, will close to effect an energization of the field contactor 17. It will be understood that after the field has been applied and the motor has attained substantially synchronous operating conditions, it is desired to brake the stator member. As has been pointed out, the timing switch 40 will interpose a short time interval, which may be for example, a period of one to three or four seconds, between the energization of the synchronous motor field and the energization of the braking contactor so as to insure stable synchronous operating conditions of the main motor before the application of the brake. As shown, the operating coil for the timing switch 40 will be energized simultaneously with the energization of the synchronous motor field. After the predetermined interval of time has elapsed, the switch 40 will close and thereby complete an energizing circuit for the braking contactor 35 from the upper conductor of a suitable alternating current course of supply 47, through the closed push button 38, the timing switch 40, the conductor 48, the closed timing switch 45, the energizing coil for the braking contactor and thence through the conductor 49 to the lower conductor of the supply source 47.

The armature of the motor 28 will then be connected with the supply source 37 in series with its field 28ª, in series with the resistance 41 and in parallel with the resistance 42. This circuit may be traced from the upper conductor of the supply source 37, through the lower branch of the resistance 41, the upper branch of the resistance 41, the lower contact of the contactor 35, the conductor 50, the armature of the motor 28, the conductor 51, the upper contact of the contactor 35, the conductor 52, the series field 28ª and thence through the conductor 53 to the lower conductor of the supply source 37.

It will be observed that the braking contactor 35, when energized to close, will close its auxiliary contact or interlock 54. Therefore, simultaneously with the energization of the motor 28, the electromagnetic brake 29 will be energized to release the motor armature. The circuit for the operating coil provided for this brake may be traced from the lower conductor of the supply source 37 through the conductor 55, the operating coil for the brake 29, the conductor 56, the closed interlock 57 operated by the contactor 43, the conductor 58, the closed interlock 54 and thence through the conductor 60 to the upper conductor of the supply source 37. Moreover, the separately excited field $28^b$ provided for the braking motor will be energized simultaneously with the energization of this motor through a circuit which may be traced from the upper conductor of the supply source 37 through the conductor 60, the closed interlock 54, the conductor 61, the separately excited field $28^b$ and thence through the conductor 53 to the lower conductor of the supply source 37.

It will be observed, therefore, that the motor 28 will have been energized to apply the initial braking force to the stator. As has been pointed out, after the field and its connected load 13 have been brought up to synchronous speed by reason of this initial braking force, it is desirable to cinch up or lock the stator securely. Moreover, as has been pointed out this additional braking force will be effected by the removal of the resistor 41 or a portion thereof from the braking motor armature circuit. The timing mechanism 44 operating through the contactor 43 performs this function.

Although any suitable time element switching mechanism may be employed, preferably and as shown, we use the timing mechanism disclosed in patent No. 1,699,125 to Stephenson. Briefly, the operation of this timing mechanism is as follows: As will be observed, the timing switching mechanism 44 will be set in operation simultaneously with the energization of the forward or braking contactor 35. Thus, when the timing switch 40 has been closed, the electromagnets 62 and 63 will have been energized. The energization of the electromagnet 62 causes the armature 64 associated therewith to be attracted and as a result the worm 65 is brought into engagement with the worm wheel 66. The switch contacts 67 of the switch 44 are mechanically held in their closed position by means of the latch 68, despite the tendency of the resilient hooked switch arm 70 associated with the armature 64 to open these contacts when the electromagnet 62 is energized. The electromagnet 63 and the disk 71 of non-magnetic electrically conducting material are intended to indicate diagrammatically an alternating current motor. As the disk 71 rotates, the worm 66 will be caused to rotate by means of the worm 65 so that eventually the pin 72 will engage the pivoted catch 68 and move the catch out of engagement with the lower end of the switch lever carrying one of the contacts 67. When the catch 68 is released, the resilient switch member 70 opens the contacts 67 and closes the contacts 73. When the contacts 67 are open, the electromagnet 63 is deenergized so that the worm wheel 65 will not be rotated further. When the contacts 73 are closed, an energizing circuit will be completed for the contactor 43 which circuit may be traced from the upper conductor of the supply source 47 through the closed push button 38, the closed timing switch 40, the closed contacts 73 of the timing switch 44, the conductor 74, the energizing coil for the contactor 43 and thence through the conductor 49 to the lower conductor of the supply source 47. Thus, the contactor 43 will close to short circuit the resistance 41 from the motor armature circuit. The torque delivered by the motor 28 will be increased proportionately by reason of the increase in the voltage impressed upon its armature and series field and the braking force exerted by the band 21 likewise will be increased proportionately. It will be understood that the timing mechanism 44 will not operate to short circuit the resistance 41 until after the field and load have been brought up to substantially synchronous speed.

It will be observed that simultaneously with the energization of the resistance contactor 43, the interlock 57 associated therewith will be opened, and the operation of the timing mechanism 45 will be initiated.

Moreover, it will be observed that the opening of the interlock 57 effects an interruption of the energizing circuit for the electromagnetic brake 29. The application of the brake 29, however, is retarded by reason of a suitable discharge resistor 76 which will have been included in a local circuit with the energizing coil for the brake upon the opening of the interlock 57. This time delay may be anywhere from one tenth to one quarter of a second. The timing switch 45 will open to effect a deenergization of the braking contactor 35 a suitable interval of time, as for example approximately one second, after the energization of the contactor 43 to short circuit the resistance 41. Upon the deenergization of the braking motor 28, the shunt field $28^b$ will be discharged through its protective discharge resistor $76^a$.

From the foregoing it will be observed that after the synchronous motor stator has attained substantially synchronous speed and the field has been applied, a braking force will be applied to the stator in two stages; in the first stage a gradual and easy braking force of sufficient magnitude to bring the stator to rest will be applied so as to permit the load to be brought up to synchronous speed, in the second stage a braking force of increased magnitude will be applied so as to securely lock the stator in its stationary position.

There are two conditions under which it may be desirable to release the brake. First, it may be desirable to stop the load without stopping the synchronous motor and second, it may be desired to shut down the operation of the main motor itself. To effect a release of the brake while the main motor is running so as to bring the load to rest without interrupting the operation of the main motor, it is but necessary to depress the release button 39. It will be observed that when the button 39 has been depressed, an energizing circuit for the release contactor 36 will be completed from the upper conductor of the supply source 47 through the conductor 77, the limit switch 78 which will have been closed by the operation of the gear train with the brake in its fully applied position, the conductor 79, the closed push button 39, the conductor 80, the operating coil for the release contactor 36 and thence through the conductor 49 to the lower conductor of the supply source 47. The contactor 36, therefore, will be closed so as to complete an energizing circuit for the motor from the upper conductor of the supply source 37 through the lower portion of the resistance 41, the upper contact of the contactor 36, the conductor 51, the armature of the motor 28, the conductor 50, the lower contact of the contactor 36, the conductor 52, the series field $28^a$ and thence through the conductor 53 to the lower conductor of the supply source 37. It will be observed that but a portion of the resistance 41 is connected in series with the armature circuit of the motor 28, while the resistance 42 is again connected in parallel with this armature circuit. This causes the motor 28 to release the brake more rapidly than it applied the brake initially but still not so rapidly as to cause the motor by reason of its inertia and that of the transmitting mechanism to swing by the motor limit switch position. As before, the energizing coil for the brake 29, and the separately excited field $28^b$ will be energized simultaneously with the energization of the motor armature. Thus, when the contactor 36 is closed, its associated interlock 81 will be closed so as to complete energizing circuits for both the brake and the separately excited field. The circuit for the brake will be completed from the lower conductor of the supply source 37 through the conductor 55, the energizing coil for the brake 29, the conductor 56, the closed interlock 57, the conductor 58, the closed interlock 81 and thence through the conductor 60 to the upper conductor of the supply source 37. The energizing circuit for the separately excited field $28^b$ may be traced from the upper conductor of the supply source 37 through the conductor 60, the closed interlock 81, the conductor 61, the separately excited field $28^b$ and thence through the conductor 53 to the lower conductor of the supply source. It will be observed that when the motor has operated the brake to its released position, the limit switch 78 will be opened so as to effect a deenergization of the release contactor 36. The electromagnetic brake 29 will be applied, and the shunt field $28^b$ will be discharged through its protective discharge resistor $76^a$. In order to again accelerate the rotor and its connected load, it is but necessary to depress the brake applying button 38. It will be understood that the brake motor will be controlled in response to the closing of this button to apply first a gradual braking torque and then an increased cinch-up braking torque in the same manner as when the start button 46 is depressed.

In the event the main motor itself be deenergized by depressing the stop button 83, it will be observed that the field contactor 17 will be deenergized and likewise the operating coil for the timing switch 40 will be deenergized. It will be observed, therefore, that even though the brake applying button 38 be in its closed position, an energizing circuit for the release contactor will be completed from the upper conductor of the supply source 47 through the conductor 77, the limit switch 78, the conductor 79, the interlock 84 which will have been closed upon the deenergization of the timing switch 40, the conductor 80, the energizing coil for the contactor 36 and thence through the conductor 49 to the lower conductor of the supply source 47. As before, the brake will be released and the limit switch 78 will operate to deenergize the release contactor 36 in the released position of the brake.

It will be observed in view of the foregoing description of the releasing operation under that condition in which the main motor is deenergized, that should the main contactor coil burn out or should the supply source for the synchronous motor fail for any reason, the brake will be automatically released. Thus, it will be observed that since the interlock 84 associated with the timing switch 40 is normally closed while the synchronous motor is not operating, the release contactor 36 will be energized to release the brake if for any reason the main motor be deenergized, irrespective of the position of the release push button 39.

While we have, in accordance with the provisions of the patent statutes, described our invention as embodied in concrete form and operating in a specific manner, it should be understood that we do not limit our invention thereto, since various modifications thereof will suggest themselves to those skilled in the art without departing from the spirit of our invention, the scope of which is set forth in the annexed claims.

What we claim as new and desire to secure by Letters Patent of the United States, is,—

1. In combination, an electric motor having rotatable field and armature members, one of said members being provided to drive a load, a brake for the other of said members, means for establishing power connections for said field and armature members, means for effecting an application of said brake and means responsive to the establishment of the power connections for said field and to a time interval for controlling said brake-applying means.

2. In combination, an electric motor having rotatable field and armature members, one of said members being provided to drive a load, a brake for the other of said members, means for establishing power connections for said field and armature members, and means dependent upon the operation of said means for applying a graduated braking force responsively to the establishment of the power connections for one of said members.

3. In combination, an electric motor having rotatable field and armature members, one of said members being provided to drive a load, a brake for the other of said members, a torque motor for applying said brake, means for establishing power connections for said field and armature members, and means for controlling said torque motor responsively to the operation of said power controlling means to effect the establishment of the power connections for one of said members.

4. A control system for an alternating current synchronous motor having rotatable field and armature members, one of said members being connected to drive a load, comprising control means for establishing power connections for said field and armature members so that the other of said members can be accelerated to substantially synchronous speed after which said field member is excited so as to lock said field and armature members in synchronism, a brake for said other member and time element means for controlling said brake responsively to the operation of said control means so that a braking force is applied a predetermined interval of time after the excitation of said field member.

5. In combination, an electric motor having rotatable field and armature members, one of said members being provided to drive a load, a brake for the other of said members, means for establishing power connections for said field and armature members and time elements means responsive to the application of said field for applying a graduated braking force, each step of which is applied for a predetermined interval of time.

6. In combination, an electric motor having rotatable field and armature members, one of said members being provided to drive a load, a brake for the other of said members, means for establishing power connections for said field and armature members and means responsive to the application of said field and to time intervals for applying a braking force a predetermined interval of time after the application of said field, said braking force having a varying magnitude, each degree of which is applied for a predetermined interval of time.

7. In combination, an electric motor having rotatable field and armature members, one of said members being provided to drive a load, a brake for the other of said members, means for establishing power connections for said field and armature members, a torque motor for controlling the application of said brake, control means responsive to a time interval for causing said torque motor to apply said brake a predetermined interval of time after the application of said field, means for limiting the motor torque and means responsive to a time interval for controlling said torque limiting means whereby after a predetermined initial braking period a torque of increased magnitude is applied.

8. In combination, a synchronous motor having rotatable field and armature members, one of said members being provided to drive a load, a brake for the other of said members, means for establishing power connections for said field and armature members, a braking motor for controlling the application of said brake, control means responsive to a time interval for causing said braking motor to apply said brake a predetermined interval of time after the application of said field, means for limiting the motor torque, means responsive to a time interval for controlling said torque limiting means whereby after a predetermined braking period a torque of increased magnitude is applied and means responsive to the operation of said torque limiting control means to effect said increased braking torque and to a time interval for deenergizing said motor.

9. In combination, an electric motor having rotatable field and armature members, one of said members being provided to drive a load, a brake for the other of said members, means for establishing power connections for said field and armature members, a braking motor for controlling the application of said brake, control means responsive to a time interval for causing said braking motor to apply said brake a predetermined interval of time after the application of said field, means for limiting the motor torque, means responsive to a time interval for controlling said torque limiting means whereby after a predetermined initial braking period a torque of increased magnitude is applied and means for causing said motor to release said brake, said torque limiting means being controlled so as to cause the releasing motor torque to be of a value intermediate the initial and final braking torques.

10. In combination, a synchronous motor having rotatable field and armature members, one of said members being connected to drive a load, a brake for the other of said members, separate electrical sources of supply for said field and armature members, means for connecting said armature member with its source of supply, means responsive to the connection of said armature with its source of supply and to a time interval for connecting said field member with its source of supply and means responsive to the connection of said field with its supply source and to a time interval for controlling the application of said brake.

11. In combination, a synchronous motor having rotatable field and armature members, one of said members being connected to drive a load, a brake for the other of said members, means for controlling the application of the synchronous motor field, an actuating motor for said brake, means responsive to the application of said motor field and to a time interval for controlling the energization of said braking motor, means for limiting the braking motor torque whereby said braking motor initially applies a braking force of reduced value, means responsive to the operation of said braking motor control means to effect the energization of said braking motor and to a time interval for controlling said torque limiting means whereby a braking force of increased magnitude is applied and means responsive to the operation of said torque limiting control means and to a time interval for deenergizing said motor a predetermined interval of time after the application of said increased braking force.

12. In combination, a synchronous motor having rotatable field and armature members, one of said members being provided to drive a load, a brake for the other of said members separate electrical sources of supply for said field and armature members, means for connecting said field and armature members with their supply sources respectively, an actuating motor operably connected to said brake, a resistance for limiting the braking torque of said actuating motor, time element switching mechanism for controlling the energization of said actuating motor to apply the brake with said resistance connected to limit the braking torque a predetermined interval of time after the connection of said field member with its source of supply, a second time element switching mechanism responsive to the operation of said first time element switching mechanism for disconnecting said resistance a predetermined interval of time after the application of said reduced torque so as to cause said motor to apply braking torque of increased magnitude and a third time element switching mechanism responsive to the disconnection of said resistance for thereafter effecting a deenergization of said motor.

13. In combination, a synchronous motor having rotatable field and armature members, one of said members being connected to drive a load, a brake for the other of said members, an actuating motor for said brake, control means for connecting said field member with a source of excitation, time element control means for energizing said brake motor to apply said brake after the application of the motor field, manually operable means for controlling the energization of said motor to release said brake, means for controlling the energization of said motor to release said brake upon the deenergization of said synchronous motor irrespective of the operation of said manually operable means and limit switching mechanism responsive to the release of said brake for effecting the deenergization of said motor after it has been energized to release the brake either in response to the operation of said manually operable means or in response to the deenergization of said synchronous motor.

14. In combination, a synchronous motor having rotatable field and armature members, one of said members being connected to drive a load, a brake for the other of said members, an actuating motor for said brake, means for connecting said field member with a source of excitation, control means for energizing said motor to apply said brake after the application of the motor field, means for limiting the motor torque, means responsive to a time interval for controlling said torque limiting means whereby after an initial braking period a torque of increased magnitude is applied, manually operable means for controlling the energization of said motor to release said brake and means for controlling the energization of said motor to release said brake upon the deenergization of said synchronous motor irrespective of the operation of said manually operable means.

In witness whereof, we have hereunto set our hands this 13th day of March, 1929.

AUBREY SMITH.
RICHARD M. MATSON.